J. A. MacMILLAN.
VEHICLE TIRE.
APPLICATION FILED APR. 26, 1909.
1,164,834. Patented Dec. 21, 1915.
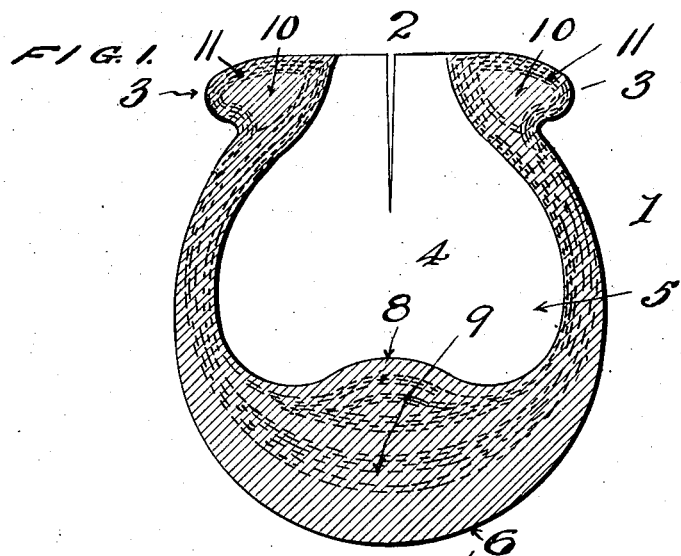
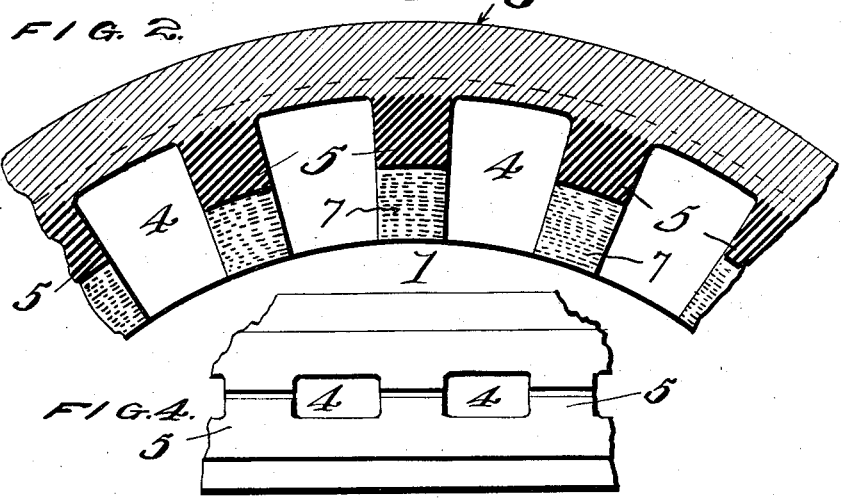
WITNESSES
C. K. Davies
E. L. Corbett
INVENTOR
J. A. MacMillan
by James W. See

UNITED STATES PATENT OFFICE.

JOHN A. MacMILLAN, OF DAYTON, OHIO.

VEHICLE-TIRE.

1,164,834. Specification of Letters Patent. Patented Dec. 21, 1915.

Application filed April 26, 1909. Serial No. 492,151.

*To all whom it may concern:*

Be it known that I, JOHN A. MACMILLAN, a citizen of the United States, and resident of the city of Dayton, in the county of Montgomery and State of Ohio, have invented certain new and useful Improvements in Vehicle-Tires, of which the following is a specification.

My invention relates to cushion tires for vehicles.

The principal object of the invention is to produce a cushion tire, which, while possessing all the advantages of a pneumatic tire, is free from its inherent defects.

In carrying out my invention in preferred form I provide a tire of exterior appearance similar to an ordinary pneumatic tire and which may be placed on an ordinary clencher rim and will securely stay in position without the use of any fastening devices.

My tire is constructed so that the deformations necessary to accommodate inequalities in the road surfaces are easily permitted and so that the tire quickly returns to its normal shape. In service the action of the tire is practically the same as that of a properly inflated pneumatic tire.

The invention will now be fully described so that persons skilled in the art may make and use the same with reference to the accompanying drawing, which shows an exemplifying structure in which the invention is embodied.

In the drawing, Figure 1 is a transverse section of a tire embodying the invention. Fig. 2 is a longitudinal section through a portion of the tire. Fig. 3 is a detail view of one of the bridges or columns. Fig. 4 is a plan view of a fragment of the base.

Reference numeral 1 designates the body or casing of the tire which may be of substantially the same external form as that of an ordinary pneumatic casing. The edges of the base 2 in a preferred construction are provided with clencher beads 3 to fit an ordinary clencher rim. The hollow interior 4 of the tire is provided at intervals with the transversely arranged blocks or columns 5. The columns at the beginning of the process of manufacture are generally separate from the tire body, but after the tire has been built and vulcanized the said columns become integral with the casing of the tire. The tread 6 of the tire body forms in effect a truss connecting the outer ends of the columns 5.

When a tire constructed as above described is in use and a projection in the road surface is encountered, the tread of the tire is compressed. If the pressure is applied to the tread at a point opposite one of the columns, the material of the columns expands in the direction of the circumference of the tire. If pressure is applied between the columns, the material of the tread is displaced inwardly between the columns. In either case the side walls of the tire expand more or less depending on the size of the obstacle encountered. On removal of the pressure the elasticity of the parts quickly restores them to normal shape.

The tire body is composed of a suitable rubber composition with canvas reinforcements. The columns 5 are generally of substantially pure, very flexible and elastic rubber or rubber composition, in comparison with the rubber of the casing, which is relatively harder and stiffer, for the purpose of resisting road wear. The material of the columns is easily displaced in any direction and quickly returns to proper shape. The canvas reinforcement extends all the way from the base of the casing at one side to the base at the other side and around the entire circumference of the tire and this reinforcement is made much heavier adjacent to the tread. The side walls of the tire are thus made thin and relatively flexible to provide for the necessary motion. The additional reinforcement in the tread incorporated with the rubber composition of the casing forms, in effect, a truss or bridge of sufficient stiffness to bear the load between the columns without breaking down, but at the same time of sufficient flexibility to cushion the shocks and absorb small obstructions in the desired manner. The whole tire structure may be considered as a circular bridgework comprising the radially-compressible and laterally-expansible columns supporting at intervals the circumferential, readily flexible beam also having substantial strength and capacity to resist deflection, consisting of the heavy canvas-reinforced tread. Additional strength and durability is imparted to the tread portion by the fact that reinforcement is not confined to the tread alone, but is continuous around the entire body of the casing, as viewed in cross section. This corresponds to the dished form of a sheet metal stamping for instance, by which much greater strength and rigidity is imparted than could be found in a flat or approximately flat structure. In other words, the canvas in the walls of the casing continues through the tread portion, mutually reinforcing each other and providing the necessary strength and supporting capacity.

The columns in a preferred construction are split centrally, longitudinally of the tire, and the adjacent faces of the splits are lined with canvas 7. When the columns are compressed and the side walls of the tire expand, these splits in the columns may open more or less and facilitate the flexible action of the tire. The slits in the successive columns form in effect a longitudinal bifurcation through the whole base of the tire. This bifurcation in addition to the function above mentioned permits easy removal of the mold blocks used to form the spaces between the columns after the tire is vulcanized.

As shown in the drawing it is usually preferred to construct the tire so that the side portions of the base are separated a substantial distance through the circumference of the tire. The columns come out flush with the base of the tire, and close the base between the cells or recesses formed by the columns. This adds materially to the lateral stability of the structure.

To increase the resistance of the tread to deformation in some cases it is desirable to provide the inside of the tread with a longitudinal bead or rib 8. This increases the thickness and stiffness of the tread on the center line. The stiffness of the tread may be further increased by a mass of canvas reinforcement 9 incorporated in the tread outside the bead.

The clencher beads, when used, are reinforced by annular rings 10 of comparatively hard rubber suitably shaped and inclosed within the canvas strips 11 which extend from one side of the base through the side walls and tread of the tire to the other side of the base, and form the main support of the tire body.

The arrangement of the columns may be greatly varied. They need not be arranged at right angles to the tread, but may be in some cases diagonally or otherwise suitably arranged. Other features of the construction may also be widely varied within the spirit of the invention. The invention described would be responded to by any cushion tire in which the interior of the tire is formed with masses of rubber interspaced with cellular openings, combined with the other essential elements of the invention.

In some cases, after the tire is otherwise completed, an additional strip, or additional strips of canvas are inserted in the slits in columns 5. This has the effect of expanding the base of the tire, and gives added tension to the locking means. The slits in the columns 5 form in effect openings between the cellular compartments of the tire and if it is desired the slits may be enlarged or other apertures may be provided through the columns 5 to connect the tire compartments. Such interconnection of the compartments permits circulation of air within the tire and assists in cooling the tire. When the slits 10 are employed, it is to be understood that when the tire is in position on the rim, under normal conditions, these slits are closed and the columns 5 form, in effect, solid, continuous, radial partitions within the tire and the bases of these columns solidly fill the space between the base portions 6 of the casing. In placing the clencher based tire on a clencher rim, the base portions are forcibly squeezed together, compressing the bases of the columns and when released these column bases forcibly and securely and yieldingly hold the clencher beads in the rim with such security that it is almost impossible to remove the tire from the rim except by cutting it off or using clamps, and in practice the tire will in almost every case remain properly seated on the rim until it is completely worn out. The expansive and powerful fastening device afforded by the columns in addition to their other functions is of great importance.

While my tire has been designed so that it is in a preferred form readily adaptable to an ordinary clencher rim and for that reason has and is described as having in a preferred form a clencher base, the form of the base may be greatly varied. The tire may have a base of any suitable form by means of which it may be secured to any of various kinds of rims.

I claim:

1. A tire consisting of an integral structure comprising a hollow casing having a clencher base with separated sides and solid, integral transverse columns of comparatively soft rubber within the tire, the columns being provided with a normally closed slit extending from the base toward the center of the tire.

2. A vehicle tire consisting of an integral structure comprising a hollow casing having a clencher base with separated sides, the interior of the tire and the space between the sides at the base being completely filled at intervals by transversely arranged radial columns of relatively soft elastic material, the columns being provided with normally closed slits extending from the base toward the center of the tire.

3. A tire comprising a hollow casing having a suitable base to permit the tire to be secured to a wheel-rim, and columns of relatively soft rubber composition in the casing serving to divide the interior of the casing into cellular compartments, the columns being slitted from their bases to approximately the center of the tire, and canvas inserted in said slits, serving to expand the base.

4. A tire comprising a hollow casing having a clencher base, the sides of the base being considerably separated, and columns of relatively soft rubber composition in the casing serving to divide the interior of the casing into cellular compartments, the columns being slitted from their bases to approximately the center of the tire, and canvas inserted in said slits, serving to expand the base.

5. A tire comprising a hollow casing having a clencher base, the sides of the base being considerably separated, and solid radial columns of rubber composition arranged within the tire at intervals, the bases of the columns being flush with the base of the tire and connecting the sides of the base at intervals, the columns being slitted from their base to approximately the center of the tire.

6. A tire comprising a hollow casing having a clencher base, the sides of the base being considerably separated, and columns of rubber composition arranged within the tire at intervals, the bases of the columns being flush with the base of the tire and connecting the sides of the base at intervals, the columns being slitted from their bases to approximately the center of the tire, and canvas strips inserted in the slits, serving to expand the base of the tire.

7. A vehicle tire comprising a casing of substantially round cross-section with relatively thick tread portions and relatively thin side walls, clencher hooks formed outwardly at the bases of the sides, said bases being considerably separated throughout the inner circumference of the tire, transverse, substantially-radial rubber columns within the casing completely filling the interior of the tire and the space between said bases at intervals, the width of the column bases being such that when the clencher members are forced into a clencher rim the expansion of the columns firmly holds said clencher hooks in position, and longitudinal stiffening reinforcement in the tread to support the tread between the columns.

8. A vehicle tire comprising a casing of approximately round cross-section, clencher hooks formed outwardly at the bases of the sides of the casing, said bases being considerably separated throughout the inner circumference of the tire and transverse radial rubber columns within the casing completely filling the interior of the tire and the space between said bases at intervals, the width of the column bases being such that when the clencher members are forced into the clencher rim, the expansion of the columns firmly holds said clencher hooks in position.

JOHN A. MacMILLAN.

Witnesses:
K. L. FINCH,
WALTER T. ELLIOTT.